United States Patent
Golo

(10) Patent No.: US 6,734,684 B2
(45) Date of Patent: May 11, 2004

(54) SPECTRAL SHAPING CIRCUIT

(75) Inventor: Dragan Golo, Kanata (CA)

(73) Assignee: Spirent Communications, Ottawa (CA)

( * ) Notice: Subject to any disclaimer, the term of this patent is extended or adjusted under 35 U.S.C. 154(b) by 0 days.

(21) Appl. No.: 10/244,168

(22) Filed: Sep. 16, 2002

(65) Prior Publication Data

US 2004/0027136 A1 Feb. 12, 2004

Related U.S. Application Data

(60) Provisional application No. 60/401,339, filed on Aug. 7, 2002.

(51) Int. Cl.$^7$ ................................................ G01R 27/28
(52) U.S. Cl. ........................................ 324/654; 375/224
(58) Field of Search ................................ 324/617, 654, 324/76.19, 76.31, 613, 615, 656; 375/224, 222, 227

(56) References Cited

U.S. PATENT DOCUMENTS 3,875,500 A * 4/1975 Fletcher et al. ............. 324/615
5,834,973 A * 11/1998 Klatser et al. ............... 330/126
6,052,420 A * 4/2000 Yeap et al. ................... 375/346

* cited by examiner

*Primary Examiner*—N. Le
*Assistant Examiner*—Amy He
(74) *Attorney, Agent, or Firm*—Freedman & Associates

(57) ABSTRACT

A testing circuit for use in an inductive coupling system to test communication devices is disclosed. The testing circuit including at least an output transformer having a frequency response for providing a signal having electrical properties compatible with a communication device to be tested; and, a spectral shaping circuit having an input port for receiving a test signal and an output port for providing a shaped test signal, the shaped test signal for being provided via the at least an output transformer to a device under test, the spectral shaping circuit for partitioning the test signal in dependence upon pre-determined spectral ranges thereof and relating to a frequency response of at least an output transformer for shaping the frequency characteristics of the received signal in approximately inverse proportion to the frequency response of the at least an output transformer.

16 Claims, 6 Drawing Sheets

SPECTRAL SHAPING CIRCUIT

This application claims benefit from United States Provisional Application No. 60/401,339 filed Aug. 7, 2002.

FIELD OF THE INVENTION

The present invention relates to the domain of communication and more specifically to a system for testing communication lines using a white noise injector system.

BACKGROUND OF THE INVENTION

Nowadays the communication paths are more and more numerous and the information that can be relayed through a single communication line increases annually. The integrity of a message transmitted along communication lines is essential for allowing sensitive information to propagate to its destination. Interference, in the form of noise, affects a signal and an occurrence of such interference is dependent upon the length of the line through which the signal travels, the location of the line, the type of the line, noise within the transmitted signal, and other noise sources proximate the line. Recently, there have been dramatic changes in the telecommunications industry. For example, deregulation of local markets resulted in the emergence of new technologies in this industry. Furthermore, a growing demand for Internet access sparked development of new technologies that deliver high-speed data services using existing infrastructure.

As is well known in the industry, Digital Subscriber Line, or DSL, is one of the most promising technologies for delivering superior service and high-speed data connections using the existing infrastructure. DSL service is implemented in several different ways, such as asymmetrical DSL, ADSL, where upstream and downstream communication have different bandwidths, symmetrical DSL, SDSL, where upstream and downstream communication have the same bandwidth. In general, these DSL services use the existing copper twisted pair that is used for conventional telephony but provide much higher bandwidth. DSL service is provided through existing telephone infrastructure; and the receiver of the service is in the form of a DSL modem. To receive such high data rates reliably, sophisticated testing is performed to determine the reliability of communication using the modem.

When a phone line is in close proximity to strong electromagnetic fields, unwanted current and voltage may be induced on the phone line. If the power level is high enough, the electrical "noise" interferes with voice and data applications running on the cabling. Because of the bandwidth difference between voice and data applications and the requirement in data applications that all bits be received correctly, this is of greater concern for data applications. In data communication, excessive electromagnetic interference (EMI) hinders the ability of remote receivers to accurately detect data packets. The end result is increased bit errors, increased network traffic due to packet retransmissions, and network congestion. For analog voice communication, EMI can create psophometric noise, which degrades transmission quality.

When a message is received by a modem in response to a request from the modem and the message is too noisy to be accurately detected, the modem transmits another request along the same communication lines, in which the noisy data propagated. Likely, in such an environment, many retransmissions are necessary. Therefore, noise has a dramatic impact on the performance of modems and networks in which the modems are deployed. Of course, a modem designed to function well even in noisier environments overcomes many of the above problems.

Communication equipment is tested by injecting noise having known characteristics within data paths of a test network and observing how in operation, the noise interferes with operation of the communication equipment. Thus, standards are provided for modem performance in the presence of noise and modems, for use in a communication network, are expected to meet or exceed these standards. When all modems exceed the standard, the congestion is unlikely due to noise alone. In order to test data extraction at the modem, line noise signals simulating common mode and differential mode noises are injected into a line under test.

A test of a modem includes steps of: injecting noise through a transformer having known characteristics in terms of frequency and amplitude, and measuring the received signal at the communication equipment. A critical piece of equipment is the transformer. Unfortunately, transformers are bulk electrical components known to have substantial variations in performance one to another. In order to reduce the effect of transformer to transformer performance variations, several options exist. In a first option, a lot of inexpensive transformers are purchased from a manufacturer who cannot guarantee the performance tolerance of the transformers within an acceptable specification. Then, each transformer has to be tested in order to determine the characteristics of the transformer. Those transformers having characteristics within acceptable tolerances are then used in construction of a noise injector for use in testing, for example of DSL equipment. Of course, among the lot of transformers purchased, only a small percentage of them is suitable for use in the test equipment; the others are discarded or resold. When further test equipment is required to be manufactured, the process is repeated.

According to a second option, a much more expensive transformer is selected for use in the noise injector circuit. The more expensive transformer has specific characteristics and acceptable tolerances guaranteed by the manufacturer who has tested the transformer. This transformer is therefore ready to be use in the noise injector circuit. However, the transformer results in increased costs of manufacturing.

Further, over time, it is possible that the characteristics of acceptable transformers will vary and may become unacceptable. This variation may affect network performance.

OBJECT OF THE INVENTION

It is an object of this invention to provide circuit that is less affected by variations in transformer performance characteristics than those circuits of the prior art.

SUMMARY OF THE INVENTION

In accordance with a preferred embodiment of the present invention, there is provided a testing circuit for use in an inductive coupling system to test communication devices, comprising: at least an output transformer having a frequency response for providing a signal having electrical properties compatible with a communication device to be tested; and, a spectral shaping circuit having an input port for receiving a test signal and an output port for providing a shaped test signal, the shaped test signal for being provided via the at least an output transformer to a device under test, the spectral shaping circuit for partitioning the test signal in dependence upon spectral ranges thereof and relating to a frequency response of at least an output transformer for shaping the frequency characteristics of the received signal in approximately inverse proportion to the frequency response of the at least an output transformer.

In accordance with another preferred embodiment of the present invention, there is provided a method of testing a communcation device comprising the steps of: providing a test signal to an input port of a spectral shaping circuit for providing a shaped test signal at an output port thereof; providing the shaped test signal to a transformer; transforming the shaped test signal; measuring the transformed shaped test signal to provide measured results; comparing the measured results against a known desired result to provide comparison results; and in dependence upon the comparison result tuning the spectral shaping circuit until the comparison result is within predetermined tolerances.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
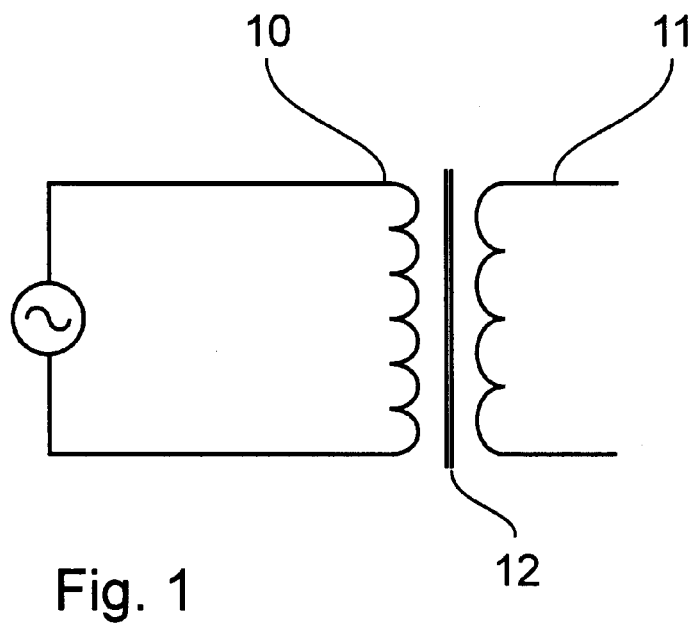
FIG. 1 is a schematic diagram of a transformer for transforming a signal.

Referring to FIG. 1, a schematic diagram of a transformer for transforming a signal is shown. Transformers include an electrostatic shield 12 between the primary coil 10 and secondary coil 11 to eliminate undesired capacitive signal coupling. The shield combined with precise matching of winding capacitances is responsible for the "common mode rejection" properties of the transformer. Of course, the electrical properties of each transformer depend on the manufacturing process used to manufacture same. It is understandable that a manufacturer producing transformers on a large scale cannot test and guarantee the exact profile of each transformer and the exact specifications of a specific transformer.

Figure 2:
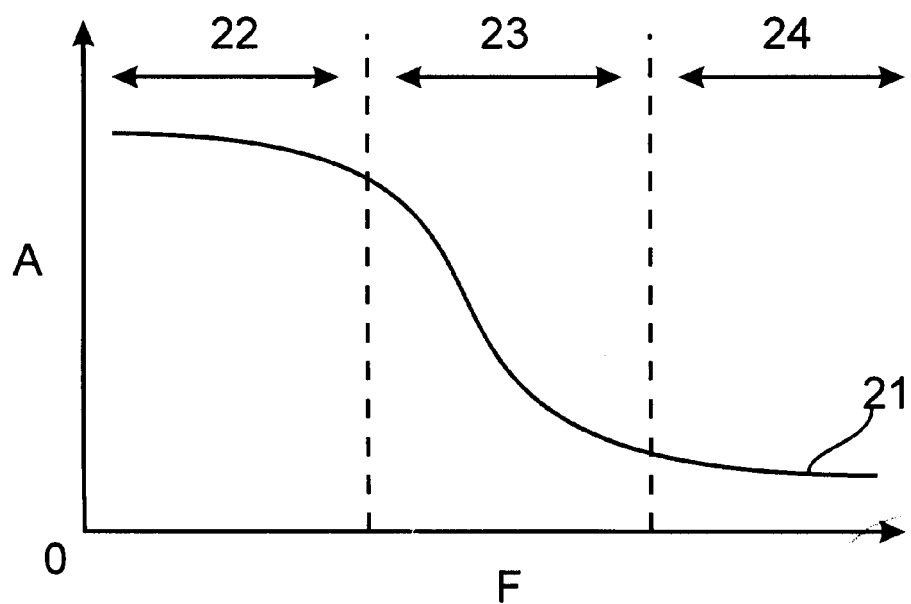
FIG. 2 is a graph of a transformer frequency response.

Referring to FIG. 2, a graph is shown of a transformer frequency response 21. Here, a first band 22 is shown having an approximately constant frequency response across the band such that signals at each frequency within the band are approximately equally affected by the transformer. A second band 23 is shown having a non linear transition response such that signals at each frequency within the second band is differently affected by the transformer. A third band 24, is shown having an approximately constant frequency response across the band such that signals at each frequency within the band are approximately equally affected by the transformer but differently affected than signals at frequencies within the first band.

Though the transformer effects are idealized in the graph of FIG. 2, it is apparent that different bands within a frequency response curve are affected differently by a transformer. Further, the frequency response for each transformer will also differ. That said, it is typical that the bands within the frequency response curve remain approximately same even for different ones of a same transformer.

Figure 3:
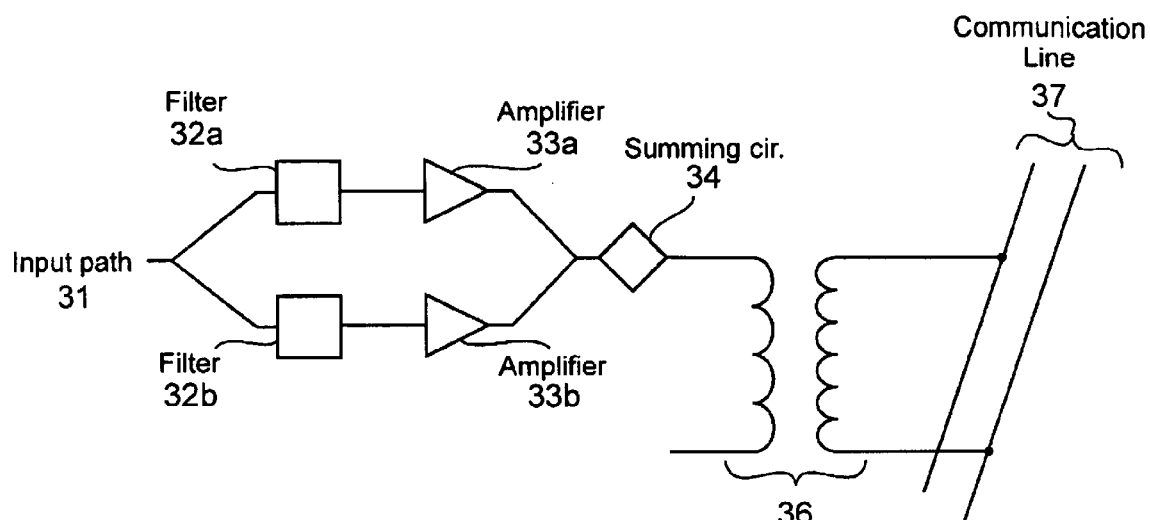
FIG. 3 is a block diagram of a spectral shaping circuit according to a first embodiment.

Referring to FIG. 3, a block diagram of a spectral shaping circuit according to a first embodiment is shown. The circuitry comprises an input path 31, which divides into a plurality of branches connected in parallel. Each branch comprises a spectral portion discrimination circuit in the form of a filter 32a and 32b electrically coupled to an amplifier 33a and 33b. Two branches are shown in the instant figure, i.e. two filters 32a and 32b are illustrated respectively coupled to amplifiers 33a and 33b. When a signal is injected at input port 31, the signal is provided to filters 32a and 32b, which filter the input signal according to their respective frequency filtering properties. Here, the entire range of frequencies is represented in the resulting signals. For example, filter 32a is a high pass filter, which suppresses the low frequencies of the injected signal and filter 32b is a low pass filter for attenuating high frequencies and retaining low frequencies unchanged. Of course, if all frequencies are to be represented, then the cutoff frequencies for the two filters are approximately equal. Each filtered signal is provided to the amplifier electrically coupled to the filter.

At the output port from the amplifiers 33a and 33b, the filtered and amplified signals from the two branches are combined at summing circuit and output driver 34. The summing circuit 34 is electrically coupled to the primary coil of the transformer 36. The secondary coil of the transformer 36 has a first connecting port for being electrically connected with a first wire and a second connecting port for being electrically connected with a second wire of a communication line 37 such that an inducted signal corresponding to the combination of the amplified signal from each filter/amplifier pair is injected into the communication line 37.

The signal injected through input 31 is a noise signal having predetermined characteristics across the frequency band such as, for example, white noise, which offers a large frequency profile extending from low frequency components to high frequency components.

Figure 4A:
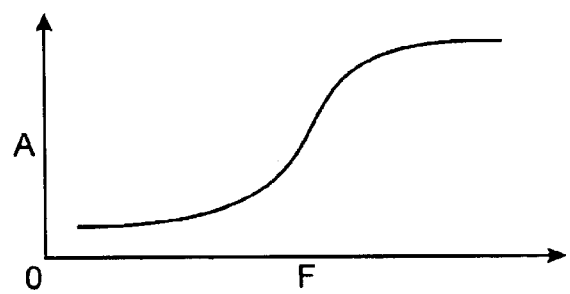
FIG. 4a is a graphical representation of a frequency response of the circuit of FIG. 3.
Figure 4B:
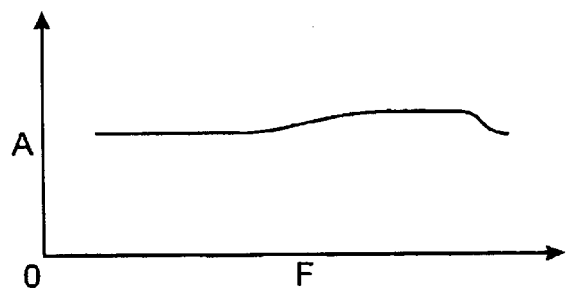
FIG. 4b is an approximately flat frequency response resulting of a multiplication of the response of the transformer and of the circuit of FIG. 3.

Advantageously, each band within the signal is affected by different amplifiers allowing for boosting of one band relative to another. Thus, spectral shaping is performed. The spectral shaping allows for a noise signal having a frequency characteristic shaped in opposition to the frequency response of one or more transformers through which the signal is to pass. As such, at an output port of the transformers, the resulting signal has a characteristic in accordance with the desired signal characteristic. For example, in FIG. 4a a graphical representation of a frequency response of the circuit of FIG. 3 is shown. Here a multiplication of the response of the transformer and of the circuit of FIG. 3 results in an approximately flat frequency response as shown in FIG. 4b.

Further advantageously, each amplifier comprises an adjustable gain in order to independently tune the resulting amplified signal for matching with a single transformer. As such, after manufacture, the spectral shaping circuit is tuned to provide a desired spectral response for the entire circuit as measured aft the transformer circuit. This allows for use of inexpensive transformers with repeatable high quality noise injection results.

Figure 5:
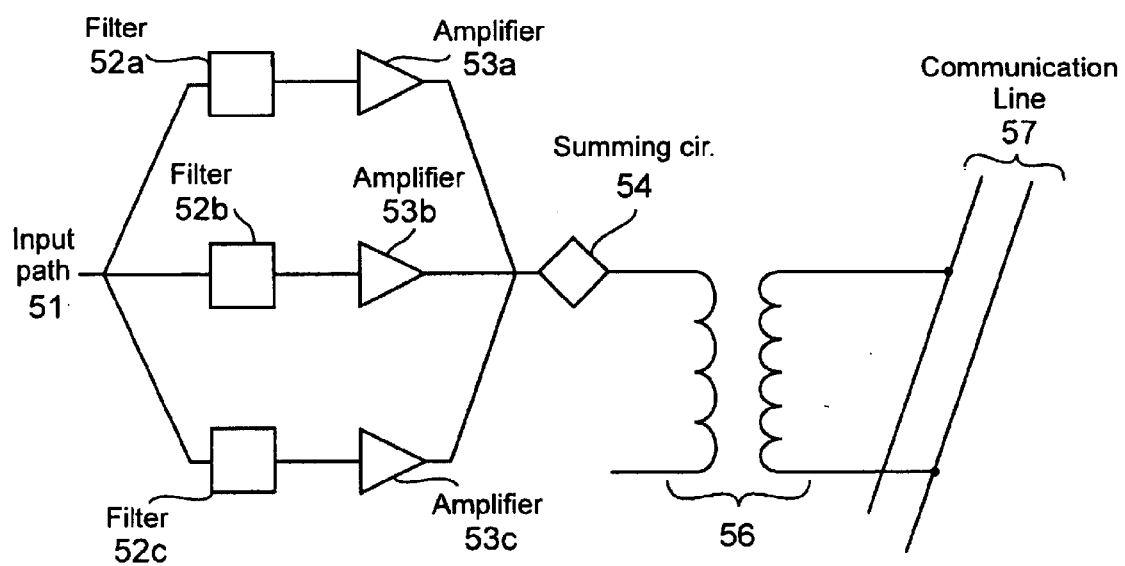
FIG. 5 is a block diagram of a spectral shaping circuitry according to a second embodiment.

Of course, depending on the tuning level that is required for testing a modem, any number of filter amplifier circuits are coupled in parallel to form the spectral shape circuitry. Referring to FIG. 5, a schematic spectral shaping circuitry according to a second embodiment is shown. The circuitry comprises an input path 51, which is coupled to a plurality of branches connected in parallel. Each branch comprises a spectral portion discrimination circuit in the form of a filter 52a, 52b and 52c electrically coupled to an amplifier 53a, 53b, and 53c respectively. When a signal is injected at input port 51, the signal is provided to filters 52a, 52b and 52c, which filter the input signal according to their respective frequency filtering properties. For example, filter 52a is a high pass filter, which suppresses the frequencies of the injected signal below a cutoff frequency, filter 52b is a low pass filter for attenuating frequency components of the injected signal above a cutoff frequency and retaining low frequency components of the injected signal unchanged and filter 52c is a bandpass filter, which attenuates low and high frequency components outside a pass band, but retains a signal portion including components within a band of frequencies. Each filtered signal is provided to an associated amplifier electrically coupled to the filter (for filter 52a it is amplifier 53a and so forth).

At the output port of the amplifiers 53a, 53b and 53c, the filtered and amplified signals from the three parallel branches are combined at summing circuit and output driver 54. The summing circuit is shown electrically coupled to the primary coil of the transformer 56. The secondary coil of the transformer 56 has a first connecting port for being electrically connected with a first wire and a second connecting port for being electrically connected with a second wire of a communication line 57 such that an injected signal corresponding to the combination of the amplified signal from each parallel branch is injected into the communication line 57.

A band is understood to be a series of consecutive frequencies between a low frequency value and a high frequency value. The cutoff frequencies are defined as being the lowest and the highest frequency within the band. Therefore, in the present description, the cutoff frequencies are determined such that little or no overlapping of the different bands exists but also such that few or no frequencies are missing from the summed signal. The cutoff frequencies of the bandpass filter are such that the lowest frequency within the band is immediately superior to the highest frequency of the low pass filter band, and the highest frequency within the band is lower and immediately inferior to the lowest frequency within the high pass filter band.

Of course, the combined signal need not be provided directly to the transformer. For example, signal conditioning and amplification is typically performed on the entire signal prior to providing same to the transformer. Further, though a single transformer is shown, the invention is applicable to applications with any number of transformers. Of course, more transformers typically result in a greater variation in frequency response between different bands and in a narrowing of the transition band.

Of course, there is no limitation for a number of parallel branches, each including a filter and an amplifier, that are used within the circuit. Further, it is possible to provide one of the filters absent an amplification circuit such that signals propagating within each parallel branch are amplified in dependence upon an intensity of a signal within the branch having no amplifier therein. Typically, it is only necessary to provide a relative adjustment between bands thereby using N−1 amplifiers for N parallel branches is often sufficient.

Figure 6:
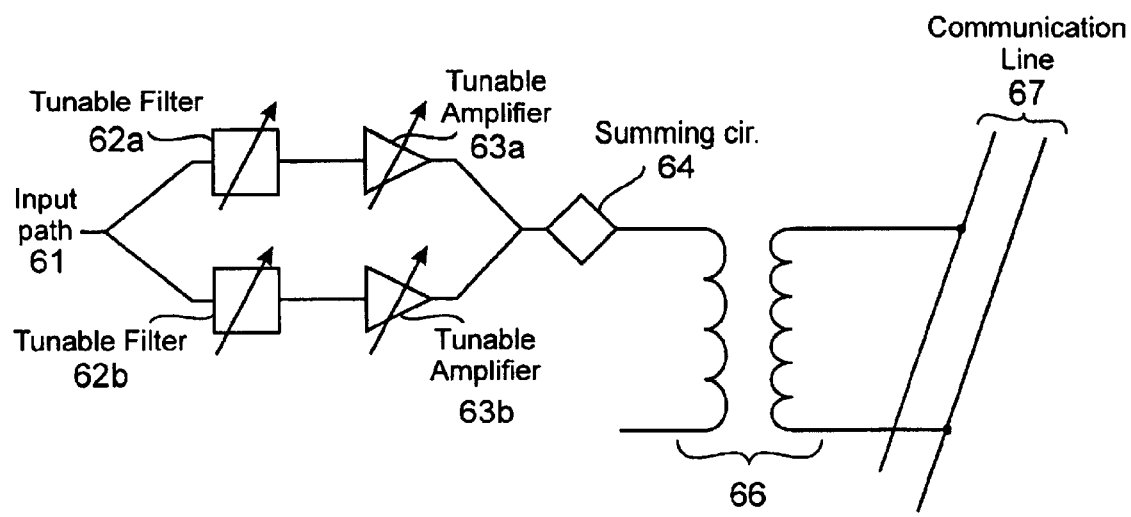
FIG. 6 is a block diagram of a spectral shaping circuit according to a third embodiment.

Referring to FIG. 6, a block diagram of a spectral shaping circuit according to a third embodiment is shown. The circuitry comprises an input path 61, which divides into a plurality of branches connected in parallel. Each branch comprises a spectral portion discrimination circuit in the form of a tunable filter 62a and 62b electrically coupled to a tunable amplifier 63a and 63b. Two branches are shown in the instant figure, i.e. two tunable filters 62a and 62b are illustrated respectively coupled to tunable amplifiers 63a and 63b. When a signal is injected at input port 61, the signal is provided to tunable filters 62a and 62b, which filter the input signal according to their respective tuned frequency filtering properties. Here, the entire range of frequencies is represented in the resulting signals. For example, tunable filter 62a is a high pass tunable filter, which suppresses the low frequency components of the injected signal and tunable filter 62b is a low pass tunable filter for attenuating high frequency components of the injected signal and retaining low frequency components unchanged. Of course, if all frequencies are to be represented, then the cutoff frequencies for the two tunable filters are approximately equal. Each filtered signal is provided to the tunable amplifier electrically coupled to the tunable filter.

At the output port from the tunable amplifiers 63a and 63b, the filtered and amplified signals from the two branches are combined at summing circuit and output driver 64. The summing circuit 64 is electrically coupled to the primary coil of the transformer 66. The secondary coil of the transformer 66 has a first connecting port for being electrically connected with a first wire and a second connecting port for being electrically connected with a second wire of a communication line 67 such that an inducted signal corresponding to the combination of the amplified signal from each tunable filter/amplifier pair is injected into the communication line 67.

The signal injected through input 61 is a noise signal having predetermined characteristics across the frequency band such as, for example, white noise, which offers a large frequency profile extending from low frequency components to high frequency components.

Figure 7:
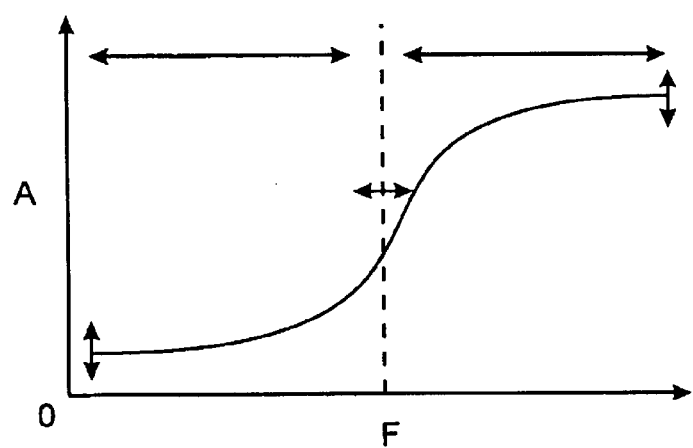
FIG. 7 is a graphical representation of a frequency response of the circuit of FIG. 6.

Advantageously, each band within the signal is affected by different amplifiers allowing for boosting of one band relative to another. Thus, spectral shaping is performed. The spectral shaping allows for a noise signal having a frequency characteristic shaped in opposition to the frequency response of one or more transformers through which the signal is to pass. As such, at an output port aft the transformers the resulting signal has a characteristic in accordance with the desired signal characteristic. For example, in FIG. 7 a graphical representation of a frequency response of the circuit of FIG. 6 is shown. As such, the circuit is tunable to compensate individually for each and every transformer installed during manufacturing such that each noise injection circuit has a same output frequency characteristic.

Of course, optionally only one of the amplification and filtering is tunable. Further optionally, both the filters are tuned in dependence one upon the other such that the cutoff frequencies thereof remain approximately equal. Optionally, one of the tunable filters is coupled to the summing circuit absent amplification of the filtered signal.

Advantageously, by adjusting either the portion of the spectrum discriminated by each filter or the gain of the amplifiers obviates the need to test a multitude of transformers. Furthermore, it obviates a need to purchase highly accurate and tested transformers. Moreover, such possibility of adjustment compensates for a potential poor tolerance range of a transformer without affecting the quality of the testing signal.

For example, the components of the device described in FIG. 6 are designed such that operating frequency bandwidth in the range of 4 kHz and 2.2 MHz with linearity within 0.05 dB is provided. Of course, the frequency bandwidth depends on the type of transformers used in the circuit.

Figure 8:
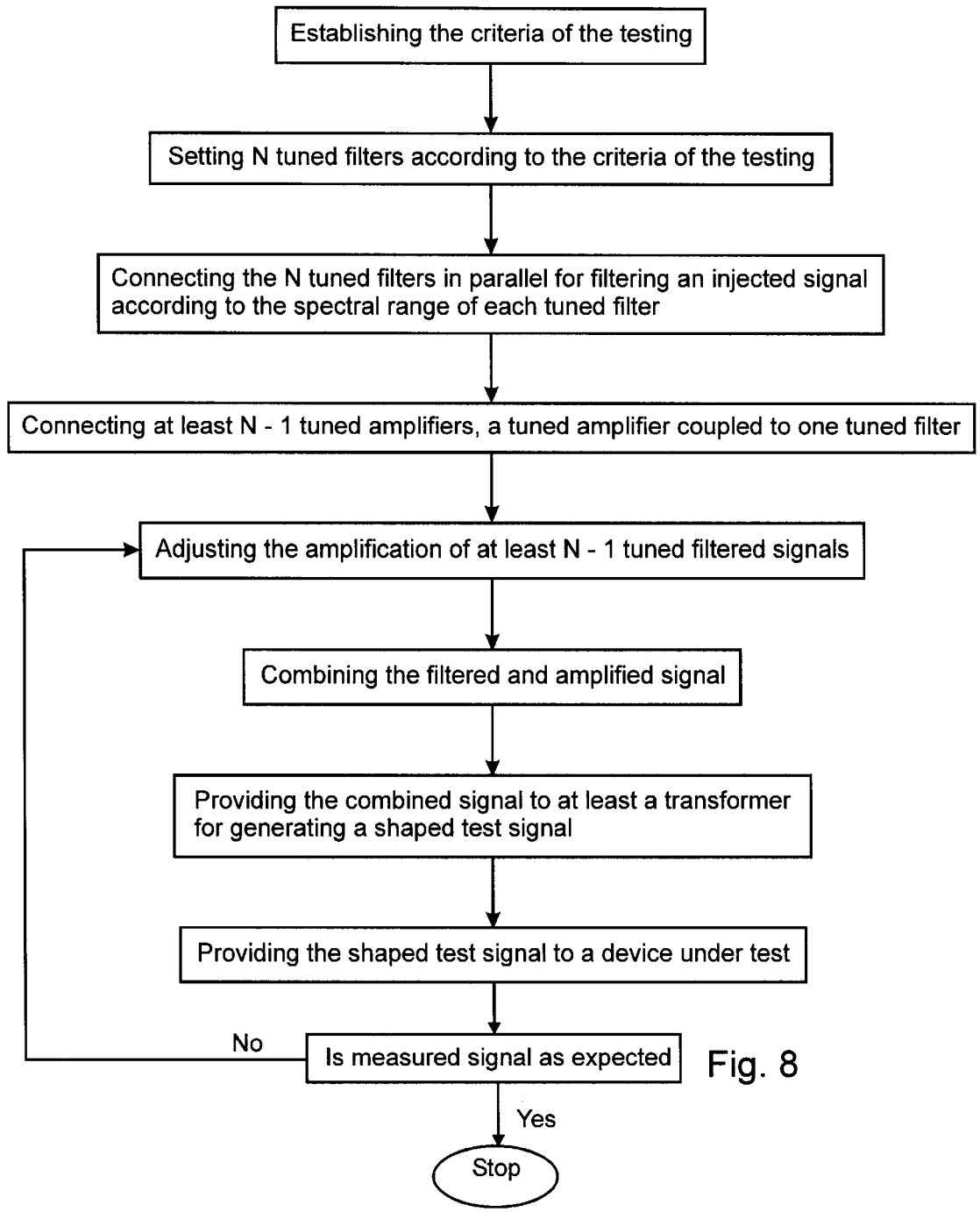
FIG. 8 is a flow chart diagram of a method of using a frequency tuning circuitry; and, FIG. 9 is a flow chart diagram of a method of using a frequency tuning circuitry by using adjustable amplifiers.

Referring to FIG. 8, a flow chart of a method of using amplification tuning circuitry is shown. The parameters of the testing are established and the ranges of the frequency spectrum to be tested are set. A known signal is provided to the circuit and a measurement of a signal output aft the transformer is made. Depending on the measurement, each portion of the signal propagating within each parallel branch is amplified in accordance with the measurement—the amplification is adjusted—and combined prior to being provided to at least a transformer. The amplifiers are adjusted iteratively until the measured signal is in accordance with the known provided signal. Thus, the resulting circuits manufactured according to the method all provide very similar frequency response for noise signals generated therein.

Figure 9:
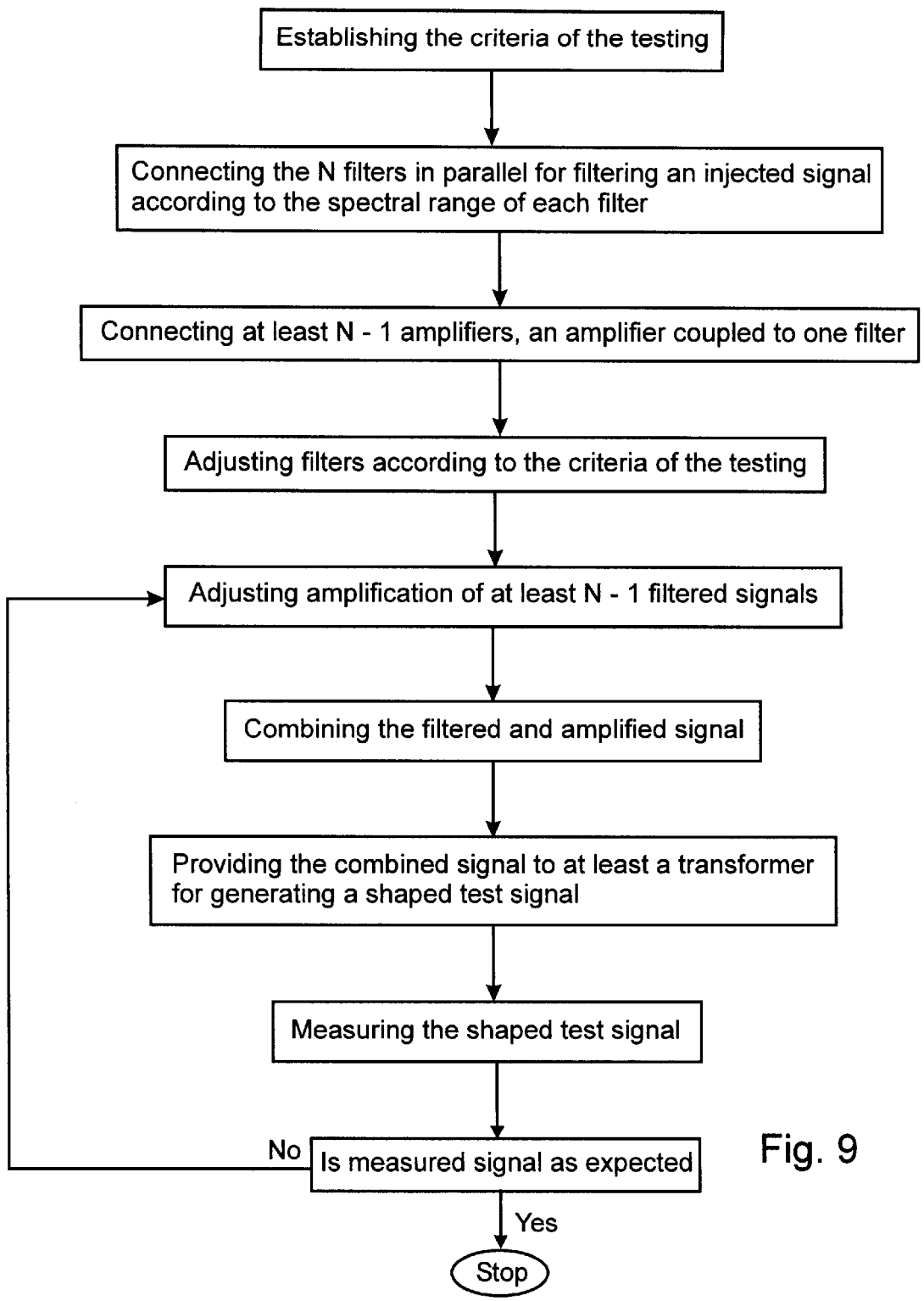

Referring to FIG. 9, a flow chart diagram of a method of using a frequency tuning circuitry by using adjustable amplifiers is shown. The parameters of the testing are established and the ranges of the frequency spectrum to be tested are set. A known signal is provided to the circuit and a measurement of a signal output aft the transformer is made. Depending on the measurement, each filter of the circuit is adjusted to discriminate a specific portion of the spectrum. Each portion of the spectrum from each filter is amplified in accordance with the measurement and combined prior to being provided to at least a transformer. The filters and amplifiers are adjusted iteratively until the measured signal is in accordance with the known provided signal. Thus, the resulting circuits manufactured according to the method all provide very similar frequency response for noise signals generated therein.

Advantageously, the testing signal presents known characteristics, which facilitates the accurate and repeatable measurement of the characteristics of a device under test. Further, when tunable filters and amplifiers are present, time related performance variations are corrected through a simple calibration process for returning the circuits within each of the parallel branches to result in an output frequency response of the device in accordance with design specifications.

Optionally, the entire signal is amplified within each parallel branch prior to filtering and summing thereof. Once filtered, the signal will reflect the amplification. Such a configuration is less desirable since more signal amplification is required and the amplifiers are required to support input signals having greater bandwidth.

Numerous other embodiments may be envisaged without departing from the spirit and scope of the invention.

What is claimed is:

1. A testing circuit for use in an inductive coupling system to test communication devices, comprising:

at least an output transformer having a frequency response for providing a signal having electrical properties compatible with a communication device to be tested; and, a spectral shaping circuit having an input port for receiving a test signal and an output port for providing a shaped test signal, the shaped test signal for being provided via the at least an output transformer to a device under test, the spectral shaping circuit for partitioning the test signal in dependence upon spectral ranges thereof and relating to a frequency response of at least an output transformer for shaping the frequency characteristics of the received signal in approximately inverse proportion to the frequency response of the at least an output transformer.

2. A testing circuit according to claim 1, wherein the spectral ranges are predetermined.

3. A testing circuit for use in an inductive coupling system to test communication devices according to claim 1, wherein the spectral shaping circuit includes a first spectral portion discrimination circuit coupled with a first amplifier for amplifying the first spectral portion and a second spectral portion discrimination circuit and a summing circuit for combining each of the first and second portions.

4. A testing circuit for use in an inductive coupling system to test communication devices according to claim 3, wherein the spectral shaping circuit a second amplifier coupled with the second spectral portion discrimination circuit for amplifying the second spectral portion.

5. A testing circuit for use in an inductive coupling system to test communication devices according to claim 4, wherein the first spectral portion corresponds to a low frequency band signal and wherein the second spectral portion corresponds to a high frequency band signal.

6. A testing circuit for use in an inductive coupling system to test communication devices according to claim 5, wherein cutoff frequencies for the first and second spectral portion are approximately equal.

7. A testing circuit for use in an inductive coupling system to test communication devices according to claim 5, wherein at least one of the first spectral portion discrimination circuit and the second spectral portion discrimination circuit is adjustable.

8. A testing circuit for use in an inductive coupling system to test communication devices according to claim 7, wherein the first amplifier for amplifying the first spectral portion and the second amplifier for amplifying the second spectral portion are tunable.

9. A testing circuit for use in an inductive coupling system to test communication devices according to claim 3, wherein the first amplifier is tunable.

10. A testing circuit for use in an inductive coupling system to test communication devices according to claim 4, wherein the first amplifier and the second amplifier are tunable.

11. A testing circuit for use in an inductive coupling system to test communication devices according to claim 3, wherein the spectral shaping circuit comprises a third spectral portion discrimination circuit coupled with a third amplifier for amplifying the third spectral portion.

12. A testing circuit for use in an inductive coupling system to test communication devices according to claim 11, wherein the third spectral portion discrimination circuit is adjustable.

13. A testing circuit for use in an inductive coupling system to test communication devices according to claim 11, wherein the third amplifier for amplifying the third spectral portion has an adjustable gain.

14. A testing circuit for use in an inductive coupling system to test communication devices according to claim 11, wherein the summing circuit includes a port for receiving the third portion and wherein in use the third portion is combined along with each of the first and second portions in the summing circuit.

15. A testing circuit for use in an inductive coupling system to test communication devices according to claim 14, wherein the first, second and third spectral portions are approximately non-overlapping in frequency domain.

16. A method of testing a communication device comprising the steps of:

provididing a test signal to an input port of a spectral shaping circuit for providing a shaped test signal at an output port thereof;

providing the shaped test signal to a transformer;

transforming the shaped test signal;

measuring the transformed shaped test signal to provide measured results;

comparing the measured results against a known desired result to provide comparison results; and in dependence upon the comparison result tuning the spectral shaping circuit until the comparison result is within predetermined tolerances.

* * * * *